United States Patent [19]

Deacon et al.

[11] Patent Number: 5,176,497
[45] Date of Patent: Jan. 5, 1993

[54] BORELESS HUB COMPRESSOR WHEEL ASSEMBLY FOR A TURBOCHARGER

[75] Inventors: Edwin R. Deacon, Skelmersdale, England; William R. Swihart, Torrence, Calif.; Jonathan R. Heim, Shelbyville, Ill.

[73] Assignee: Allied-Signal Inc., Morristown, N.J.

[21] Appl. No.: 644,082

[22] Filed: Jan. 22, 1991

[51] Int. Cl.$^5$ .............................. F01D 25/16
[52] U.S. Cl. ................ 415/230; 415/172.1; 415/200; 416/204 A; 403/361; 417/407
[58] Field of Search ........... 415/170.1, 172.1, 203, 415/200, 206, 229, 230, 915, 104, 107; 416/204 R, 204 A, 244 R, 244 A; 403/296, 340, 343, 361; 417/405, 406, 407, 423.13, 424.2

[56] References Cited

U.S. PATENT DOCUMENTS

| | | |
|---|---|---|
| 2,649,050 | 4/1951 | Dibdin . |
| 3,961,867 | 6/1976 | Wollenweber . |
| 4,128,283 | 12/1978 | Palmer . |
| 4,157,834 | 6/1979 | Burdette . |
| 4,340,317 | 7/1982 | Heitmann et al. . |
| 4,613,281 | 9/1986 | Lubieniecki . |
| 4,705,463 | 11/1987 | Joco . |
| 4,850,820 | 7/1989 | Gutknecht . |
| 4,944,660 | 7/1990 | Joco ........................ 416/204 A |
| 4,986,733 | 1/1991 | Fleury et al. . |

Primary Examiner—Edward K. Look
Assistant Examiner—Christopher M. Verdier
Attorney, Agent, or Firm—Ken C. Decker

[57] ABSTRACT

An improved compressor wheel assembly for a a turbocharger or the like includes a centrifugal compressor wheel having a boreless hub to substantially improve wheel fatigue life. The compressor wheel is formed as by casting from an aluminum alloy to include an integral mounting sleeve extending coaxially from the boreless hub and adapted for connection as by threading with a turbocharger shaft. An annular spacer ring of wear resistant material is mounted on the wheel mounting sleeve and defines wear resistant surfaces for supporting one or more seal rings within the bore of a compressor backplate opening, and for axially engaging an adjacent thrust bearing unit associated with the turbocharger shaft.

20 Claims, 3 Drawing Sheets

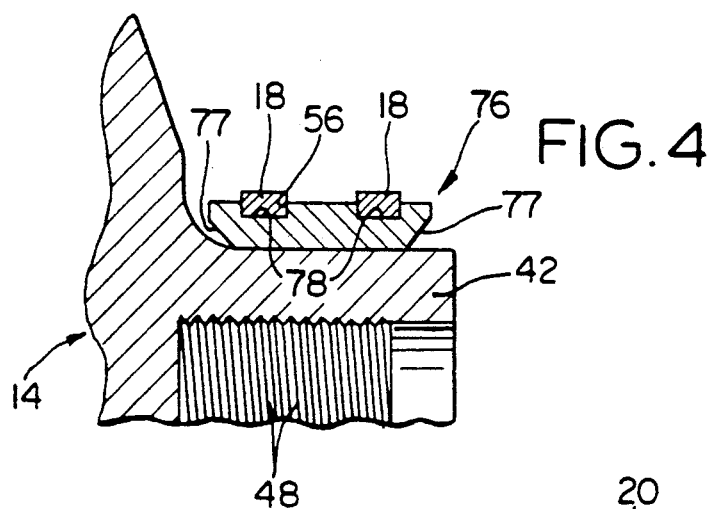
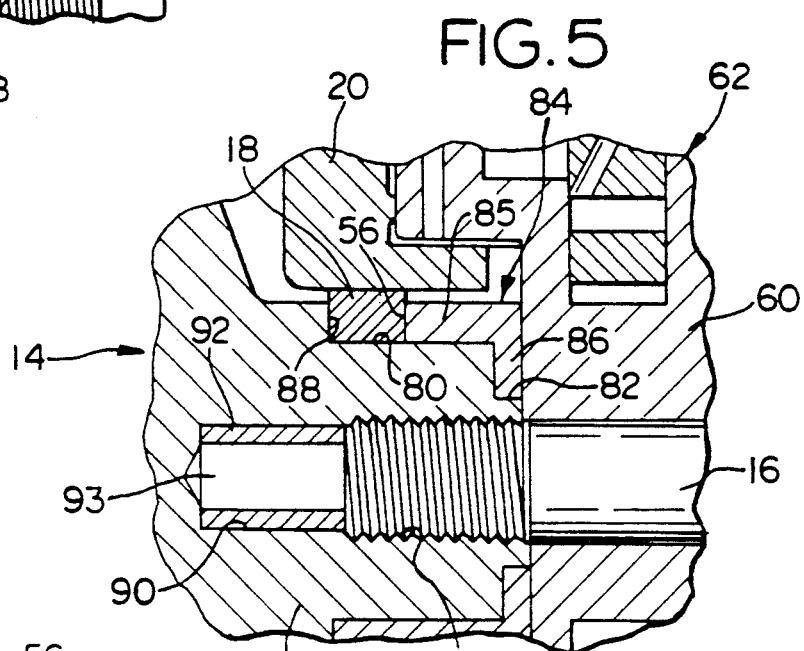
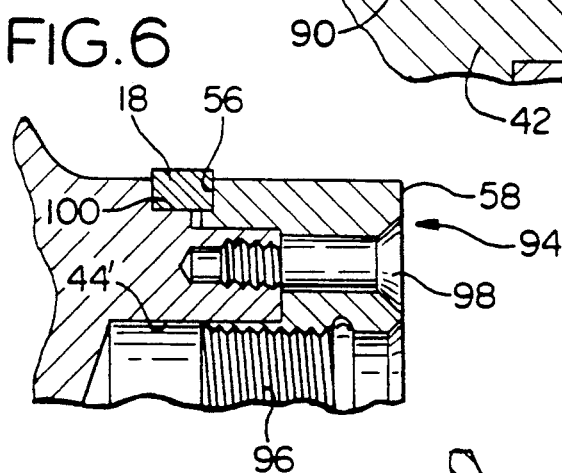
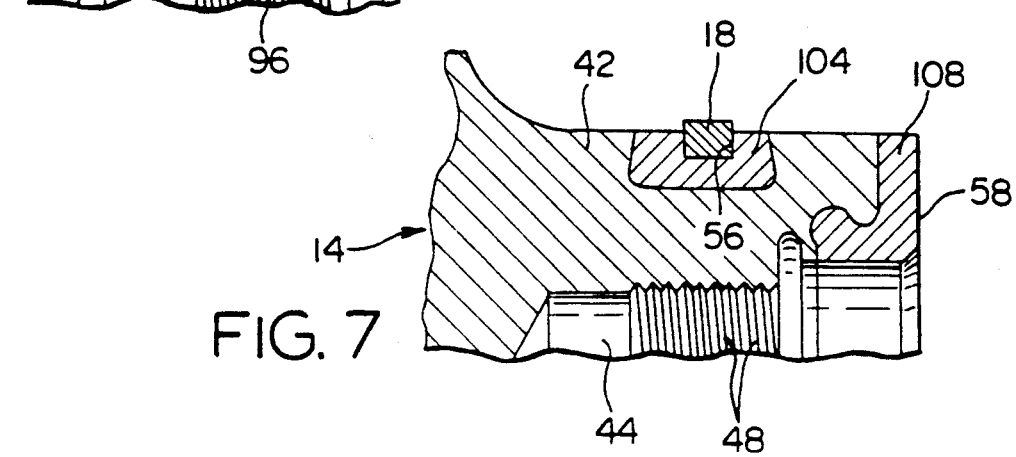

BORELESS HUB COMPRESSOR WHEEL ASSEMBLY FOR A TURBOCHARGER

BACKGROUND OF THE INVENTION

This invention relates generally to improvements in turbocharger compressor wheels and the like, and related compressor wheel assemblies designed for extended wheel fatigue life. More particularly, this invention relates to an improved compressor wheel assembly of the boreless hub type, wherein the compressor wheel assembly includes a spacer ring of wear resistant material for contacting adjacent turbocharger structural surfaces.

Centrifugal compressor wheels in general are well known in the art for use in turbochargers and the like, wherein the compressor wheel comprises an aerodynamically contoured array of impeller blades supported on a central wheel hub section which is mounted in turn onto a rotatable shaft for rotation therewith. In the context of a turbocharger, by way of example, the wheel hub section conventionally includes a central axial bore through which the shaft extends, and a threaded nut is fastened over the shaft at a nose end of the compressor wheel to hold the hub section tightly against a shaft shoulder or other diametrically enlarged structure such as a thrust bearing unit on the shaft. The rotatable turbocharger shaft thereby drives the compressor wheel in a direction such that the contoured blades axially draw in air for discharge radially outwardly at an elevated pressure into a volute-shaped chamber of a compressor housing. The pressurized air is then supplied from the housing to the air intake manifold of a combustion engine for mixture and combustion with fuel, all in a well known manner.

In recent years, improvements in compressor technology and design have resulted in progressive increases in compressor efficiency and flow range, together with more rapid transient response characteristics. For example, compressor wheels for turbochargers are known wherein the contoured impeller blades exhibit compound and highly complex curvatures designed for optimum operational efficiency and flow range. Such complex blade shape is most advantageously and economically obtained by a casting process wherein the wheel hub section and blades are integrally formed desirably from a lightweight material, such as aluminum or aluminum alloy, chosen for its relatively low rotational inertia consistent with rapid wheel accelerations and decelerations during transient engine operating conditions. Cast compressor wheels of this general type, however, have occasionally exhibited a relatively short, finite fatigue life resulting in undesired occurrences of wheel fatigue failure during operation. More specifically, when the compressor wheel is rotated at very high speeds, the cast aluminum material is subjected to relatively high centrifugal loading in a tangential direction particularly near the center, wherein the hub region of the compressor wheel must support the rapidly rotating wheel mass by the action of radial and tangential stresses. The impact of these stresses is especially severe when the compressor wheel is operated at a relatively high speed, rapid speed cycle environment as encountered, for example, in many modern turbocharger installations. Unfortunately, as previously described, the hub region of the compressor wheel normally includes a major void in the form of the central bore for receiving the rotatable shaft, wherein the central bore acts a major stress riser rendering the wheel highly susceptible to fatigue failure in the hub region. This fatigue failure problem is compounded by the presence of any metallurgical imperfections, such as dross, voids, and/or inclusions which sometimes occur inherently during the casting process and tend to congregate in the hub region of the compressor wheel.

Improvements in cast compressor wheels have been proposed in the form of a compressor wheel having a boreless hub section to eliminate the stress riser site provided by the conventional shaft bore. While such alternative wheel designs theoretically provide extended fatigue life, a variety of significant design problems have been encountered.

For example, boreless hub compressor wheels have normally included an internally threaded sleeve extending coaxially from the boreless hub for attachment to the threaded end of a rotatable turbocharger shaft. This threaded sleeve is formed to avoid any internal bore within the centrifugal compressor wheel along the axial span between the nose end and a plane corresponding with the maximum diameter of the wheel. To avoid undesired axial extension of the turbocharger or the like, the threaded sleeve is fitted through an adjacent bore or opening in a compressor backplate for direct attachment to the rotatable shaft, with one or more seal rings being carried about the sleeve for sealing contact with the backplate. However, assembly of the various components, including threaded attachment of the sleeve to the shaft while seating one or more seal rings within the backplate opening, can be extremely difficult. Moreover, when the threaded sleeve is cast integrally with the compressor wheel from the same lightweight material, the sleeve possesses inadequate structural hardness to support the seal ring or rings without undue wear, or to engage adjacent structural surfaces such as a thrust bearing unit without undue wear.

Alternative boreless compressor wheel designs have envisioned welded attachment of a separate sleeve formed from a suitable hard bearing material onto a boreless hub wheel, as disclosed in U.S. Pat. No. 4,705,463. While this approach reduces wear attributable to seal rings and/or contact with thrust bearing components, the concept encounters significant balancing problems and may undesirably introduce new stress riser zones within the wheel hub region as a result of exposure to welding heat. Other boreless wheel configurations have utilized modified thrust bearing components with axially elongated spacer sleeves projecting into the backplate opening for supporting one or more seal rings, as disclosed in U.S. Ser. No. 428,927, filed Oct. 30, 1989.

The present invention provides further alternative compressor wheel assembly designs wherein wear resistant components and/or surfaces are assembled onto a mounting sleeve of a boreless hub compressor wheel, and further wherein the wear resistant components are strategically positioned to minimize and/or eliminate wear of the cast wheel structure. Moreover, the wear resistant components are designed for relatively simple mounting onto the cast wheel structure, without requiring welding processes.

SUMMARY OF THE INVENTION

In accordance with the invention, an improved compressor wheel assembly is provided for use in a turbocharger or the like, wherein the wheel assembly includes a centrifugal compressor wheel of the type having a boreless hub. The compressor wheel is formed as by casting from a lightweight material such as aluminum or aluminum alloy, and includes an integral mounting sleeve extending coaxially from the boreless hub for attachment as by threading to a rotatable shaft of a turbocharger or the like. An annular spacer member of a wear resistant material is assembled with the mounting sleeve and defines wear resistant surfaces for contacting adjacent structures such as adjacent turbocharger components during normal rotational operation of the compressor wheel.

In accordance with a preferred form of the invention, the annular spacer member comprises a spacer ring formed from a wear resistant material such as steel and adapted for mounting by interference or shrink fit or other suitable techniques directly onto the integral mounting sleeve of the cast wheel structure. The spacer ring defines or otherwise cooperates with the mounting sleeve to define an annular groove for seated reception of a seal ring for engaging a compressor backplate within the bore of a backplate opening during compressor wheel rotational operation. The spacer ring provides a wear resistant annular sidewall for supporting the seal ring with minimal mechanical wear during compressor operation, wherein gas pressure associated with the compressor wheel normally causes the seal ring to migrate in an inboard direction away from the compressor wheel.

In addition, the annular spacer ring defines an axial wear face presented in an inboard direction for contacting a turbocharger thrust bearing unit or stepped shoulder on the turbocharger shaft when the compressor wheel assembly is mounted onto the turbo-charger shaft. Accordingly, the comparatively softer cast wheel structure is spaced by the spacer ring from contacting adjacent turbocharger structures whereat relatively high mechanical wear can otherwise occur.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 4 is an enlarged fragmented sectional view corresponding generally with FIG. 3, but illustrating a further alternative form of the invention;

FIG. 5 is an enlarged fragmented sectional view similar to FIGS. 3 and 4, but depicting still another alternative embodiment of the invention;

FIG. 6 is an enlarged fragmented sectional view similar to FIGS. 3-5, and illustrating a further alternative preferred form of the invention; and FIG. 7 is an enlarged fragmented sectional view similar to FIGS. 3-6 and illustrating still another alternative preferred form of the invention.

DETAILED DESCRIPTION OF THE PREFERRED EMBODIMENT

Figure 1:
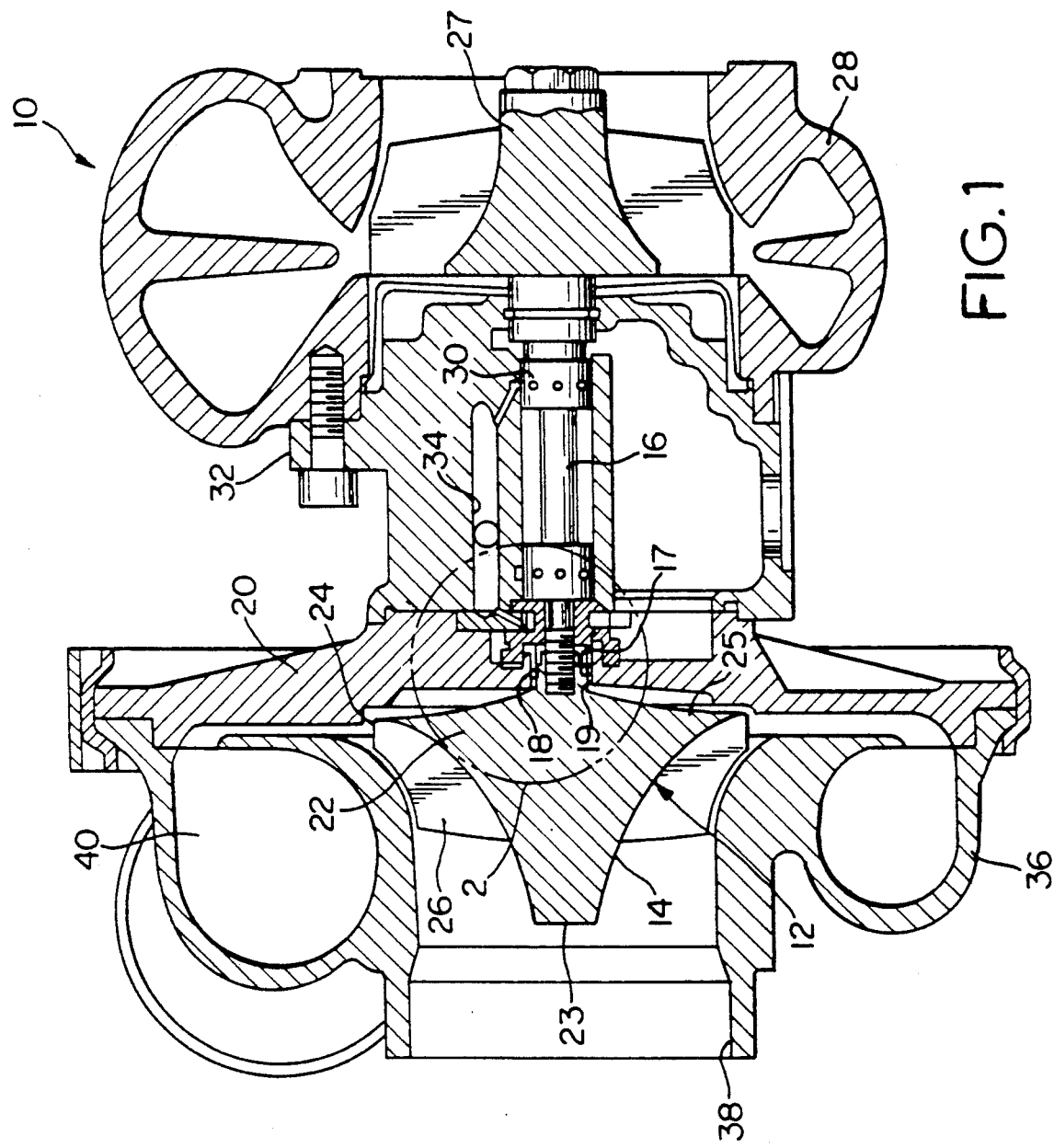
FIG. 1 is a sectional view of a turbocharger including a boreless hub compressor wheel assembly embodying the novel features of the invention.

As shown in the exemplary drawings, a turbocharger or the like referred to generally in FIG. 1 by the reference numeral 10 includes an improved compressor wheel assembly 12 of the type having a boreless hub compressor wheel 14. The compressor wheel assembly 12 is adapted for quick and easy mounting of the compressor wheel 14 onto a rotatable turbocharger shaft 16, with the compressor wheel assembly 12 including an annular spacer ring 17 of a wear resistant material for supporting one or more seal rings 18 within an opening 19 of a compressor backplate 20.

The improved boreless hub compressor wheel assembly 12 of the present invention beneficially uses a compressor wheel 14 of the boreless hub type to achieve significant improvements in wheel rotational speed range and extended fatigue life during normal operation, for example, in a modern turbocharger environment. In this regard, the compressor wheel 14 comprises a centrifugal compressor wheel of the type having a central hub 22 extending along a rotational axis between a relatively small diameter nose 23 at one end to a significantly larger wheel or tip diameter 24 at an opposite end. A back disk 25 is defined as a circular surface at the larger diameter of the wheel 14, facing axially away from the nose 23, wherein the back disk 25 may be contoured to extend axially from the plane of maximum wheel diameter as shown in the accompanying drawings. The central hub 22 of the compressor wheel 14 supports an array of aerodynamically contoured impeller blades or vanes 26 which sweep smoothly with complex curvatures between the nose 23 and the tip diameter 24.

The compressor wheel 14 is formed preferably by casting from a relatively lightweight, relatively low inertia material such as aluminum or a selected aluminum alloy. Importantly, as clearly shown in FIG. 1, the central hub 22 of the compressor wheel 14 has a boreless construction in that there are no internal voids in the region extending axially between the wheel nose 23 and the plane of largest wheel diameter adjacent the back disk 25. As is known in the art, the use of a boreless type compressor wheel avoids formation of a conventional central bore for passage of the turbocharger shaft 16, wherein such central bore undesirably defines a stress riser which effectively restricts maximum rotational speed of the compressor wheel and/or contributes to a shortened wheel fatigue life especially in a rapid speed cycle environment. See, for example, U.S. Pat. No. 4,705,463 and copending Ser. No. 428,927, filed Oct. 30, 1989, which are incorporated by reference herein. In accordance with the present invention, the boreless hub wheel 14 is configured for facilitated manufacture and to include the annular spacer ring 17 for use in effective sealing of turbocharger component passage through the backplate opening 19.

The illustrative compressor wheel assembly 12 is shown within the turbocharger 10 of generally conventional overall geometry and operation. In particular, by way of brief explanation and as viewed in FIG. 1, turbocharger 10 includes a turbine wheel 27 mounted within a turbine housing 28 adapted for flow-through passage of exhaust gases from an engine (not shown). The exhaust gases rotatably drive the turbine wheel 27 for correspondingly rotating the turbocharger shaft 16 supported by suitable bearings 30 within a so-called center housing 32. Lubrication ports 34 and related flow passages within the center housing 32 are provided for circulating lubricating oil to the bearings 30, with the oil flow and bearing design accommodating relatively high speed shaft rotation. The turbocharger shaft 16 extends in turn through the backplate 20 for connection to the compressor wheel 14 to rotatably drive the compressor wheel within a compressor housing 36. During such wheel rotation, the compressor wheel assembly 12 draws in ambient air through an axial intake 38 and discharges the air radially into a volute chamber 40 at elevated pressure. Such pressurized air is supplied in turn from the compressor housing 36 to the intake manifold or the like of a combustion engine (not shown) for admixture and combustion with fuel. This provision of pressurized air to the engine results in a substantial increase in mass flow through the engine to correspondingly permit engine operation at increased performance levels.

Figure 2:
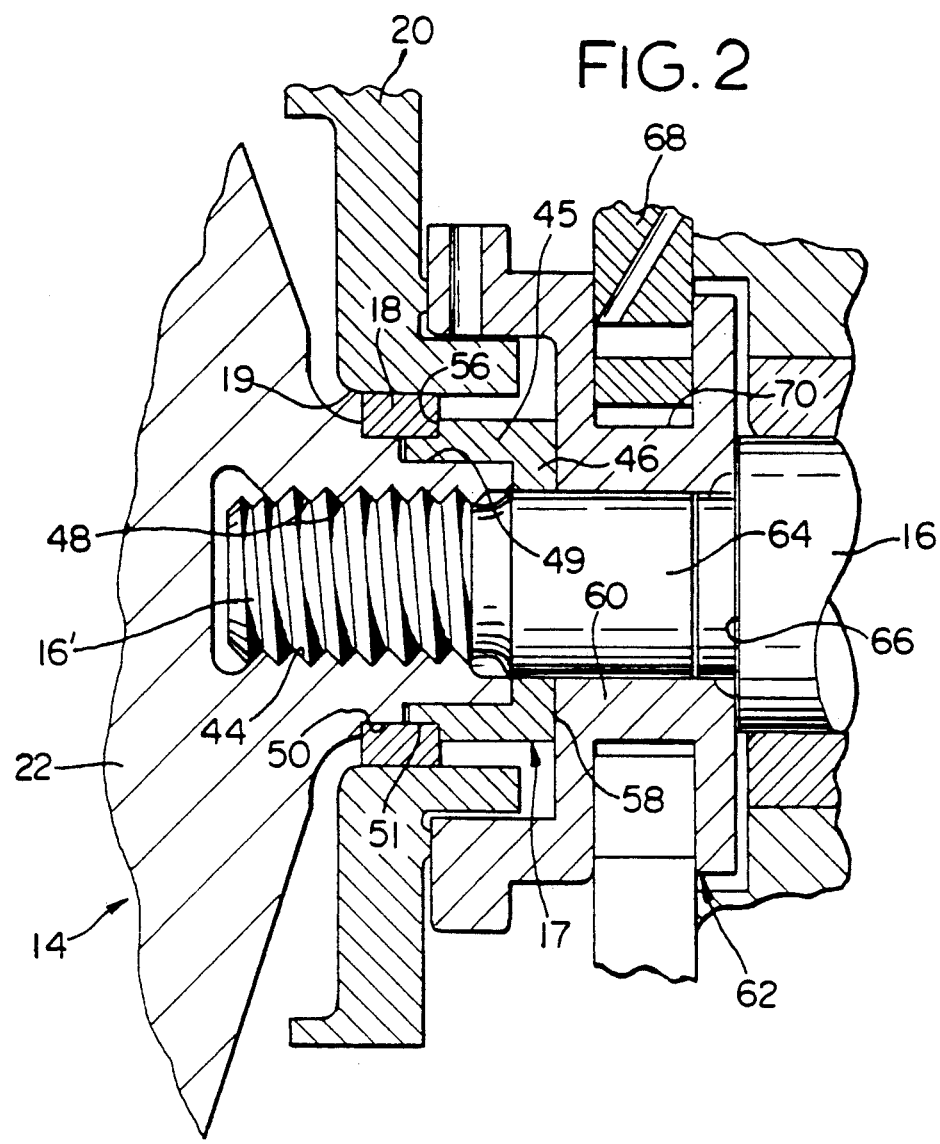
FIG. 2 is an enlarged fragmented sectional view corresponding generally with the encircled region 2 of the FIG. 1.

As shown best in FIG. 2, the boreless hub compressor wheel 14 includes a mounting sleeve 42 adapted for connection to the adjacent end of the turbocharger shaft 16. This mounting sleeve 42 is formed integrally with the compressor wheel 14 as a one-piece or unitary casting, such that the wheel 14 and sleeve 42 are formed from the same material and with significant precision balance relative to a rotational wheel axis. A central bore 44 is formed in the mounting sleeve 42 for receiving the end of the turbocharger shaft, as will be described in more detail. Importantly, the sleeve bore 44 terminates in axially spaced relation to the plane of maximum wheel diameter to avoid intrusion into the wheel hub region 22. Accordingly, the compressor wheel has a boreless hub with the mounting sleeve 42 extending coaxially from the back disk 25 in a direction away from the wheel nose 23.

The annular spacer ring 17 is sized and shaped for secure mounting onto the wheel mounting sleeve 42. The spacer ring 17 is formed from a relatively hard wear resistant material such as steel and functions to engage adjacent turbocharger structural components to prevent mechanical wear of the softer cast wheel material. In one preferred form as viewed in FIG. 2, the spacer ring 17 has a generally L-shaped cross sectional geometry to define an axially extending wall 45 mounted in interference or shrink fit relation about the distal end of the wheel mounting sleeve 42. In addition, the spacer ring 17 defines a short radial wall 46 extending radially inwardly a short distance from the axial wall 45 to overlie the inboard end of the wheel mounting sleeve 42. The radially inner margin of this radial wall 46 terminates at a diameter sufficient to avoid interference with internal threads 48 formed within the central bore 44 of the mounting sleeve 42.

In the embodiment of FIG. 2, the annular spacer ring 17 is sized to fit about a reduced diameter land 49 at the inner or inboard end of the mounting sleeve 42. A radially outermost margin of the ring 17 is positioned for generally coaxial alignment with a radially outermost margin of the mounting sleeve 42, such that the mounting sleeve 42 with spacer ring 17 assembled thereon are sized for relatively close clearance through the opening 19 in the compressor backplate 20 when a threaded end 16' of the turbocharger shaft 16 is threaded into the mounting sleeve bore 44. Intermediate diameter lands 50 and 51 are formed in facing relation on the mounting sleeve 42 and the spacer ring 17 to define a radially outwardly open annular groove for receiving and supporting the piston-type seal ring 18 to contact the backplate 20 within the backplate opening 19. Importantly, with this geometry, the spacer ring 17 provides an axially outboard-facing thrust wall 56 of wear resistant characteristics to minimize mechanical wear attributable to the effects of pressurized gas within the compressor housing 36 tending to urge the seal ring 18 in an inboard direction toward the turbocharger center housing 32.

In addition, the annular spacer ring 17 provides a second wear resistant thrust wall 58 for engaging adjacent bearing components of the turbocharger when the compressor wheel 14 is assembled with other turbocharger components for operation. More particularly, the second thrust wall 58 is defined at the axially inboard end of the spacer ring and contacts an outboard side of a thrust collar 60 forming a portion of a conventional thrust bearing unit 62 in a turbocharger assembly. The thrust collar 60 has an annular shape and is conventionally mounted onto a reduced diameter shaft land 64 in an axial position between a radially enlarged shaft shoulder 66 and the axially inboard surface of the compressor wheel assembly 12 as defined by the wear resistant thrust wall 58. A horseshoe-shaped thrust bearing 68 is seated within a radially outwardly open annular channel 70 in the thrust collar 60, and this thrust bearing 68 is normally retained axially between the turbocharger center housing 32 and the compressor backplate 20 for purposes of axially setting and retaining the positions of the rotatable components.

Accordingly, the improved compressor wheel assembly 12 provides the benefits of a boreless hub compressor wheel construction wherein the compressor wheel is formed from a cast and typically lightweight material such as aluminum alloy or the like. The wear resistant spacer ring 17 mounted onto the compressor wheel 14 provides specific wear resistant surfaces for engaging adjacent turbocharger bearing structure and for supporting the seal ring 18 within the backplate opening 19. Accordingly, mechanical wear of the compressor wheel 14 is significantly reduced.

Figure 3:
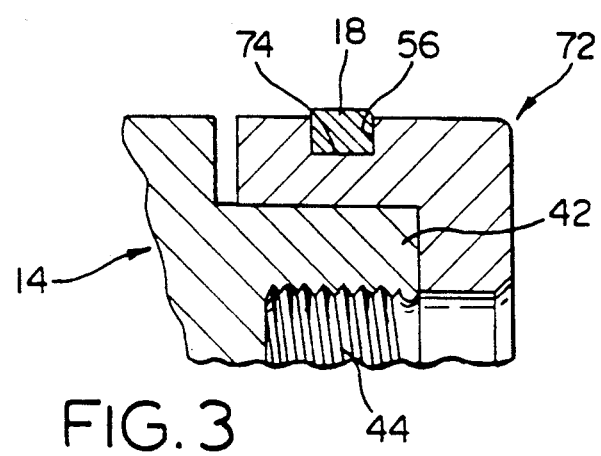
FIG. 3 is an enlarged fragmented sectional view illustrating one alternative preferred form of the invention.

FIG. 3 illustrates an alternative preferred form of the invention, wherein a modified annular spacer ring 72 includes a radially outwardly open seal ring groove 74 formed therein as by machining or the like. In this embodiment, the seal ring groove 74 is formed entirely within the spacer ring 72 for receiving and supporting the seal ring 18 within the opening or bore of the compressor backplate. An inboard side edge of the groove 74 thus defines the thrust wall 56 of the desired wear resistant material.

FIG. 4 illustrates a further alternative preferred form of the invention wherein an annular spacer ring 76 has a generally cylindrical shape for interference or shrink fit mounting onto the exterior of the wheel mounting sleeve 42. In this embodiment (FIG. 4), neither the mounting sleeve 42 nor the spacer ring 76 are shaped to include stepped lands, although the spacer ring 76 preferably includes chamfered edges 77 to assist mounting thereof onto the wheel sleeve 42. One or more seal ring grooves 78 are formed in the exterior of the spacer ring 76 for receiving and supporting seal rings 18 within the compressor backplate opening. Once again, the inboard side edge of each ring groove 78 defines the wear resistant thrust wall 56 contacted by the associated seal ring 18 during normal turbocharger operation.

A further modified spacer ring geometry is shown in FIG. 5, wherein the wheel mounting sleeve 42 is shaped to define a pair of stepped lands 80 and 82 for seated reception of a spacer ring 84 of L-shaped cross section. In this embodiment, the spacer ring 84 includes an axial wall 85 seated about the land 80 and a short radially inwardly projecting wall 86 inset and seated about the land 82. An outboard side edge of the axial wall 85 defines the wear resistant thrust wall 56 which cooperates with an inboard-facing shoulder 88 on the mounting sleeve 42 to define a radially outwardly open groove into which the seal ring 18 is mounted. In addition, as shown in FIG. 5, the central bore 44 of the mounting sleeve may include the threads at an inboard zone, in combination with a smooth-bore outboard zone 90 into which a liner sleeve 92 of wear resistant material is mounted. The liner sleeve 92 is adapted for coaxially receiving an unthreaded pilot nose tip 93 of the turbocharger shaft 16.

A further alternative form of the invention is shown in FIG. 6 wherein an annular spacer ring 94 includes an internally threaded bore 96 extending in coaxial alignment with an unthreaded bore 44' of the mounting sleeve 42. With this configuration, the spacer ring 94 provides wear resistant material for threaded engagement with the turbocharger shaft 16. In this embodiment, the spacer ring 94 can be adapted for interference or shrink fit mounting onto the sleeve 42, wherein the mounting arrangement can be supplemented by a plurality of circumferentially arranged and axially extending mounting screws 98 or other suitable fastener devices. An axially outboard edge 56 of the spacer ring 94 cooperates with a stepped land 100 on the mounting sleeve to provide a groove into which the seal ring 18 is received. Similarly, an axially inboard face 58 of the ring 94 defines a second thrust wall for engaging adjacent turbocharger bearing components in the manner described previously with respect to FIG. 2.

FIG. 7 shows a further alternative arrangement of the invention wherein the wear resistant surfaces are defined by annular surface treatments and/or coatings applied to the mounting sleeve 42 of the boreless hub compressor wheel 14. As shown in FIG. 7, a wear resistant zone 104 can be formed circumferentialy about the mounting sleeve 42 to define a seal ring groove for receiving the seal ring 18. Similarly, the axially inboard face of the mounting sleeve 42 can include a wear resistant zone 108 defining the thrust wall 58 for engaging adjacent bearing components. These wear resistant zones 104 and 108 may be produced by various surface treatments and/or coatings, including diffusion coatings, laser hardening, etc. as applied to the mounting sleeve 42 to provide the desired localized wear resistant structures in a boreless hub compressor wheel.

The compressor wheel assembly 12 of the present invention thus provides the benefits of a boreless hub compressor wheel while minimizing or eliminating mechanical wear attributable to rotational contact with adjacent turbocharger structures.

A variety of further modifications and improvements to the present invention will be apparent to those skilled in the art. Accordingly, no limitations of the invention is intended by way of the foregoing description and accompanying drawings, except as set forth in the appended claims.

What is claimed is:

1. A compressor wheel assembly, comprising:
  a compressor backplate defining a backplate opening;
  a rotatable shaft having a threaded end; a centrifugal compressor wheel having a boreless hub supporting an array of impeller blades, and a mounting sleeve formed integrally with and extending coaxially from said hub, said mounting sleeve defining an internal bore, said mounting sleeve extending into said backplate opening and having said shaft end received into said mounting sleeve bore;
  an annular spacer ring of a wear resistant material secured to said mounting sleeve and installed with said compressor wheel when the compressor wheel is installed on said shaft and removed with the compressor wheel when the compressor wheel is removed from said shaft, said ring defining a radially outwardly open groove disposed generally within said backplate opening;
  at least one seal ring seated within said groove in substantial sealing engagement between said spacer ring and said backplate; and
  a thrust collar separate from said annular spacer ring rotatable with said shaft, said thrust collar having an annular channel receiving a thrust bearing for axially setting and retaining said shaft.

2. The compressor wheel assembly of claim 1 wherein said compressor wheel comprises a casting of an aluminum material.

3. The compressor wheel assembly of claim 1 wherein said spacer ring is formed from steel.

4. The compressor wheel assembly of claim 1 wherein said spacer ring is mounted with interference fit onto said mounting sleeve.

5. The compressor wheel assembly of claim 1 wherein said mounting sleeve has an exterior surface defining a radially inwardly stepped land for receiving said spacer ring, said spacer ring cooperating with said mounting sleeve to define said groove, said spacer ring defining an axially presented thrust wall of wear resistant material on the side of said groove disposed opposite to said wheel hub.

6. The compressor wheel assembly of claim 1 wherein said mounting sleeve has a pair of said grooves formed therein, said at least one seal ring comprising a pair of seal rings mounted respectively within said grooves.

7. The compressor wheel assembly of claim 1 wherein said mounting sleeve bore is internally threaded for threaded connection to said shaft.

8. The compressor wheel assembly of claim 1 wherein said shaft includes an unthreaded pilot tip, said mounting sleeve bore including an unthreaded portion disposed generally adjacent to said wheel hub and a threaded portion, and further including a liner sleeve of wear resistant material seated within said unthreaded portion of said mounting sleeve bore for receiving said pilot tip of said shaft.

9. The compressor wheel assembly of claim 1 wherein said spacer ring further includes a radially inwardly extending annular wall of wear resistant material disposed generally at the end of said mounting sleeve opposite said wheel hub.

10. The compressor wheel assembly of claim 1 wherein said spacer ring has a generally L-shaped cross-section.

11. A compressor wheel assembly, comprising:
  a compressor backplate defining a backplate opening;
  a rotatable shaft having a first end;
  a compressor wheel having a boreless hub supporting an array of impeller blades, and a mounting member formed integrally with and extending coaxially from said hub into said backplate opening;

means for interconnecting said shaft first end with said mounting member in generally coaxial alignment for rotation of said compressor wheel with said shaft;

spacer means of a wear resistant material secured to said mounting member and installed with said compressor wheel when the compressor wheel is installed on said shaft and removed with the compressor wheel when the compressor wheel is removed form said shaft, said spacer means defining a radially outwardly open groove disposed generally within said backplate opening;

at least one seal ring carried within said groove in sealing relation with said backplate; and a thrust collar separate from said spacer means rotatable with said shaft, said thrust collar having an annular channel receiving a thrust bearing for axially setting and retaining said shaft.

12. The compressor wheel assembly of claim 11 wherein said mounting member comprises an internally threaded mounting sleeve, and wherein said shaft first end comprises an externally threaded first end.

13. The compressor wheel assembly of claim 11 wherein said compressor wheel comprises a casting of an aluminum material.

14. The compressor wheel assembly of claim 11 wherein said spacer ring is mounted with interference fit onto said mounting sleeve.

15. The compressor wheel assembly of claim 11 wherein said mounting sleeve has an exterior surface defining a radially inwardly stepped land for receiving said spacer ring, said spacer ring cooperating with said mounting sleeve to define said groove, said spacer ring defining an axially presented thrust wall of wear resistant material on the side of said groove disposed opposite to said wheel hub.

16. The compressor wheel assembly of claim 11 wherein said mounting sleeve has a pair of said grooves formed therein, said at least one seal ring comprising a pair of seal rings mounted respectively within said grooves.

17. The compressor wheel assembly of claim 11 wherein said shaft includes an unthreaded pilot tip, said mounting sleeve bore including an unthreaded portion disposed generally adjacent to said wheel hub and a threaded portion, and further including a liner sleeve of wear resistant material seated within said unthreaded portion of said mounting sleeve bore for receiving said pilot tip of said shaft.

18. The compressor wheel assembly of claim 11 wherein said spacer ring further includes a radially inwardly extending annular wall of wear resistant material disposed generally at the end of said mounting sleeve opposite said wheel hub.

19. The compressor wheel assembly of claim 11 wherein said spacer ring has a generally L-shaped cross-section.

20. The compressor wheel assembly of claim 18 further including a thrust bearing unit on said shaft, said radially inwardly extending annular wall of said spacer ring contacting one axial side of said thrust bearing unit.

* * * * *